United States Patent
Bühring et al.

[19]

[11] Patent Number: 6,097,761
[45] Date of Patent: Aug. 1, 2000

[54] METHOD AND SYSTEM FOR THE TRANSMISSION OF DATA AND POWER

[75] Inventors: Peter Bühring; Robert Mores, both of Hamburg; Egon Jöhnk, Norderstedt, all of Germany

[73] Assignee: U.S. Philips Corporation, New York, N.Y.

[21] Appl. No.: 09/020,925

[22] Filed: Feb. 9, 1998

[30] Foreign Application Priority Data

Feb. 11, 1997 [DE] Germany .............................. 197 04 884
Jan. 2, 1998 [DE] Germany .............................. 198 00 048

[51] Int. Cl.$^7$ ................................. H04B 3/06; H04L 25/00
[52] U.S. Cl. ....................... 375/257; 375/259; 340/310.2; 455/3.3
[58] Field of Search ...................................... 375/257, 259; 340/310.01, 310.02, 310.03, 310.04, 310.06, 310.07; 455/3.3, 270

[56] References Cited

U.S. PATENT DOCUMENTS

| | | | |
|---|---|---|---|
| 4,348,582 | 9/1982 | Budek | 219/483 |
| 4,535,401 | 8/1985 | Penn | 364/132 |
| 4,599,598 | 7/1986 | Komoda et al. | 340/310 A |
| 5,003,457 | 3/1991 | Ikei et al. | 364/133 |
| 5,033,112 | 7/1991 | Bowling et al. | 455/603 |
| 5,148,144 | 9/1992 | Sutterlin et al. | 340/310 A |
| 5,457,629 | 10/1995 | Miller et al. | 364/424.01 |
| 5,684,826 | 11/1997 | Ratner | 375/222 |
| 5,920,253 | 7/1999 | Laine | 340/310.01 |
| 5,994,998 | 11/1999 | Fisher et al. | 340/310.01 |

FOREIGN PATENT DOCUMENTS

| | | |
|---|---|---|
| 3907652A1 | 9/1990 | Germany . |
| 4138065A1 | 5/1993 | Germany . |

*Primary Examiner*—Chi H. Pham
*Assistant Examiner*—Bryan Webster
*Attorney, Agent, or Firm*—Leroy Eason

[57] ABSTRACT

Power and data are both transmitted over a single transmission line to which a power source and a number of stations are connected. A bipolar AC voltage is supplied to the line by the power source, the half cycle pulses of one polarity being used for supply of power only, while transmission of data is achieved by modulation exclusively of the half cycle pulses of the other polarity. High power is supplied to the stations by providing pulses of the one polarity at a low ohmic level. Only low power is required for modulation for the purpose of data transmission, and so the pulses of the other polarity are supplied at a relatively high ohmic level. Thus, only two conductors are required, one of which can be replaced by the system ground in the simplest case. If three conductors are provided, it is possible to achieve improved tolerance of defects in a conductor. At least parts of the system are maintained in operation, in the event of a short-circuit, by providing separation units which automatically disconnect different segments of a short-circuited line and automatically reconnect them after the short-circuit has been eliminated.

25 Claims, 10 Drawing Sheets

METHOD AND SYSTEM FOR THE TRANSMISSION OF DATA AND POWER

BACKGROUND OF THE INVENTION

The invention relates to the transmission of data and power via a common transmission line to which a power source and several stations are connected, each of the stations essentially being capable of receiving power and data via the transmission line and of transmitting data via the transmission line.

If one and the same line is used for the transmission of power and of data, this line need comprise only few individual conductors or wires, no more than two conductors in the extreme case. This considerably reduces the cost of the line, especially in systems having a wide spatial distribution. This principle has accordingly been used in various forms in the past.

DE 39 07 652 A1 discloses a circuit arrangement in which a current supply unit delivers a DC voltage to a two-wire bus line to which several stations are connected. An energy storage device in the form of a capacitor is present in each individual station, is charged by the DC voltage on the bus lines via a rectifier and a resistor, and serves as the current supply to the electronic circuit of the station. For data transmission, the bus lines are intermittently short-circuited in dependence on the data to be transmitted. This means, however, that the current supply unit must deliver the DC voltage to the bus line at a comparatively high-ohmic level, so that only a limited number of stations can be supplied through this line, and in particular no high loads can be supplied at the stations.

DE 41 38 065 A1 discloses a device for the transmission of data and power via a transmission line in which said line comprises two wires and a common screen inside which the two wires are accommodated. The individual stations are connected to the two wires and to the screen, receiving half the operational current through each wire, while the full operational current is returned through the screen. The data are transmitted on both lines by means of voltage signals in counterphase. The power is derived from the two conductors by means of current sinks in the stations so as to load said voltage signals as little as possible with the power transmission. This requires comparatively expensive means for achieving a substantially constant DC voltage for supplying the circuits in the stations, and the power which can be transmitted to the stations is limited also in this case.

It is an object of the invention to provide a method as well as a system for the transmission of data and power via the same line in which the power which can be transmitted is essentially not limited, while nevertheless data can be supplied at a high-ohmic level in a very reliable transmission mode of the line.

SUMMARY OF THE INVENTION

According to the invention, this object is achieved in that an AC voltage is transmitted through two transmission lines, the voltage of one polarity being used for electrical power supply of the stations and the voltage of the other polarity being used for data transmission. The two conductors are thus used in time multiplex for the transmission of electrical power and the data, the stations being supplied from a local energy storage device during data transmission, which device is charged again during the power transmission phase. The polarity reversal renders it possible to arrange the electrical supply and the data transmission with the highest degree of independence from one another. The transmission method for data and the static and dynamic properties of the electrical supply, and also of the application loads in the stations, as applicable, are decoupled from one another both by the time sequence and also by the polarity change. Reliable data transmission can thus also be achieved with the simplest type of modulation.

It is important for reliable operation of such a system that this decoupling is already provided by the use of the AC voltage, and thus takes place without active synchronization of the stations themselves and without actions taking place in the stations, such as, for example, an operational switchover. This decoupling at the stations can be simply realized by means of passive components if the current is derived from the conductors in only one direction for the electrical supply, for example by means of diodes, while the current is modulated in the other direction for the transmission of data only. The avoidance of an active mode switch-over or synchronization in the stations leads to a very simple and reliable system.

The power source, in the form of a generator which introduces the AC voltage into the two conductors, can generate this voltage without any relation to ground potential. Therefore a short-circuit of a conductor with the system ground or with some other supply line is acceptable and requires no corrective actions whatsoever.

Given a suitable arrangement of the system, moreover, conductor interruption defects can also be accommodated if a third conductor is used as a replacement for the interrupted conductor. The system ground may also be used as the replacement for the interrupted conductor, in which case the system function is retained in such a back-up mode, but the differential operation typically will no longer effectively contribute to the electromagnetic compatibility (EMC) of the system. When the system ground is used as the replacement conductor, a short-circuit of a conductor can no longer be accepted at the same time, depending on the arrangement.

To protect the generator supplying power to the lines in the case of a short-circuit, the defective conductor, or one of the defective conductors may be disconnected by means of a fuse in the generator. This means, however, that power supply and data transmission will not be possible to the connected stations in such embodiments of the system according to the invention. It is possible to insert at least one separation unit in at least one of the conductors so as to be able to operate at least some stations in the case of a short-circuit, which separation unit automatically interrupts the relevant conductor in case of a short-circuit. The system can thus be operational with at least some of the stations in that case. Especially if the conductor system is constructed as a ring line and several distributed separation units are used, it is possible for major portions of the system to remain operational in case of short-circuits.

The separation units each comprise at least one monitoring unit and one switch, which monitoring unit controls the switch in the relevant line such that the switch is opened in the case of short-circuits or overloads. The switch is shunted by a current-limiting element. The potential is thus transferred to the conductor portion following the separation unit at a high-ohmic level. The monitoring unit controls the switch in the separation unit on the basis of this potential. When a short-circuit or an overload has been eliminated, the switch will automatically be closed by the monitoring unit.

The switch preferably comprises two field effect power transistors (FETb) of the same conductivity type whose sources are interconnected. Their gates are also interconnected and coupled to a control transistor of the monitoring unit. The control transistor is preferably also a field effect transistor, of opposite conductivity type to the power transistors in the switch, and is connected to the second conductor which during normal operation has a different potential from that of the conductor in which the switch with the power transistors is included. The monitoring unit monitors the potential of the connected conductor portions. If this potential rises above a first triggering threshold, which lies above the threshold voltage of the field effect transistors of the monitoring units, the control transistor becomes conducting and connects the non-interrupted conductor to the gates of the power transistors in the switch. This renders the power transistors in the switch conducting, so that the switch is closed. In case of short-circuits or overloads, the potential at the connected conductor portions drops to below a second triggering threshold which may be equal to the first triggering threshold, so that the control transistors of the monitoring unit, and accordingly the power transistors of the switches to be controlled become nonconducting, which interrupts the conductor and effectively separates the short-circuited conductor portion from the remaining operational part of the conductor system.

Since the control transistor is capable of driving the power transistors of the switch into conduction in one half wave of the AC voltage only, the switch is supplemented with a power storage element. This power storage element preferably is a capacitor which is charged, for example, during the positive half wave and stores up the necessary power for keeping the switch closed also during the negative half wave. This capacitor is connected between the junction point of the two sources of the power transistors of the switch and the junction point of the interconnected gates of the power transistors. Short-circuits occurring only during that half wave in which the switch is closed by the stored charge of the capacitor, however, are not recognized. It is achieved by a further provision, however, that the separation unit also recognizes short-circuits during the second half wave.

The conductivity type of the power transistors in the switch determines in which half wave short-circuits are recognized.

The current-limiting element which shunts the switch is preferably a high-ohmic resistor or a controllable resistor combination, and is denoted as test resistor below. The potential is transferred to the output of the separation unit via this test resistor when the switch is opened. When the short-circuit is eliminated, a potential necessary for triggering the monitoring unit arises across the test resistor, and the switch is closed automatically.

The test resistor may be advantageously operated in steps. For this purpose, the current-limiting element comprises several ohmic resistors connected in series, individual resistors being shunted by switching transistors. High-ohmic and low-ohmic test resistances can thus be realized. First the potential is conducted from the input of the separation unit to the output of the separation unit via a high-ohmic test resistor. If the monitoring unit now detects a short-circuit, the switch in the separation unit remains open, i.e. the transistors in the switch are non-conducting. The test resistor is switched over to a lower-ohmic value only when a potential is detected which lies above the first triggering threshold, while the switch is closed.

An increase in the detection reliability of short-circuits is achieved by means of a hysteresis for the triggering threshold of the control transistor of the monitoring unit. During normal operation with closed switch, the triggering threshold is higher so as to register a potential drop quickly in the case of a short-circuit and to open the switch quickly. The triggering threshold is lower when the switches are open, with the object of achieving a faultless test for short-circuits via the high-ohmic test resistor.

It is ensured through the use of such separation units that a short-circuit, for example in the supply line to a station, will not hamper a communication between other stations.

It is an advantage of the invention that the failure tolerance operates without actions, for example mode switch-over, whereby a high reliability and consistency of the system is achieved. A further advantage is that the differential transmission remains intact also in the case of defects, and thus the advantages of the low radiation level, a high degree of immunity to incoming interference, and a high tolerance of ground level shifts between stations are retained. A further advantage is that the time reference for the implementation of the data transmission protocol may be very unsharp, or may be entirely absent, because the starting point of the AC voltage already provides a reliable demarcation in time from which a reliable scanning of the bits in a data telegram is derived.

BRIEF DESCRIPTION OF THE DRAWING

Embodiments of the invention will be explained in more detail below with reference to the drawing, in which.

DESCRIPTION OF THE PREFERRED EMBODIMENTS

Figure 1:
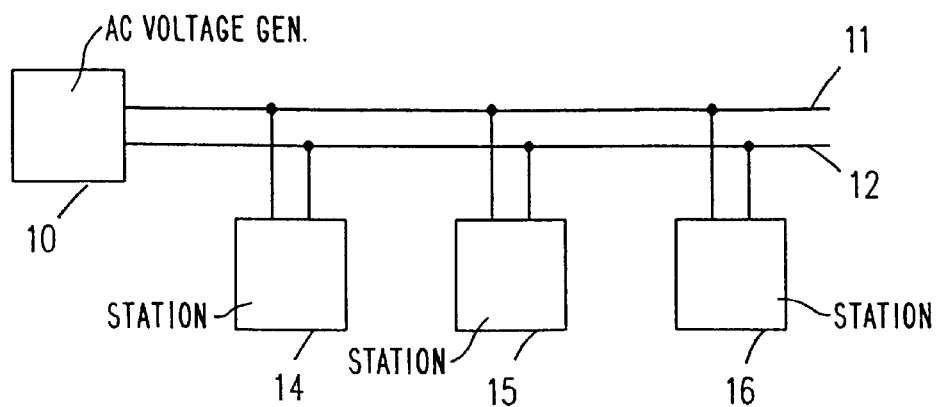
FIG. 1 shows the construction principle of a system with a power source and several stations which are interconnected by means of two transmission lines.

FIG. 1 shows a system for the transmission of data in which an AC voltage is generated by a generator 10 and fed into two lines 11, 12. The connected stations 13, 14, 15 are electrically supplied by the positive half wave of the AC voltage and transmit data during the negative half wave of the AC voltage.

Figure 2:
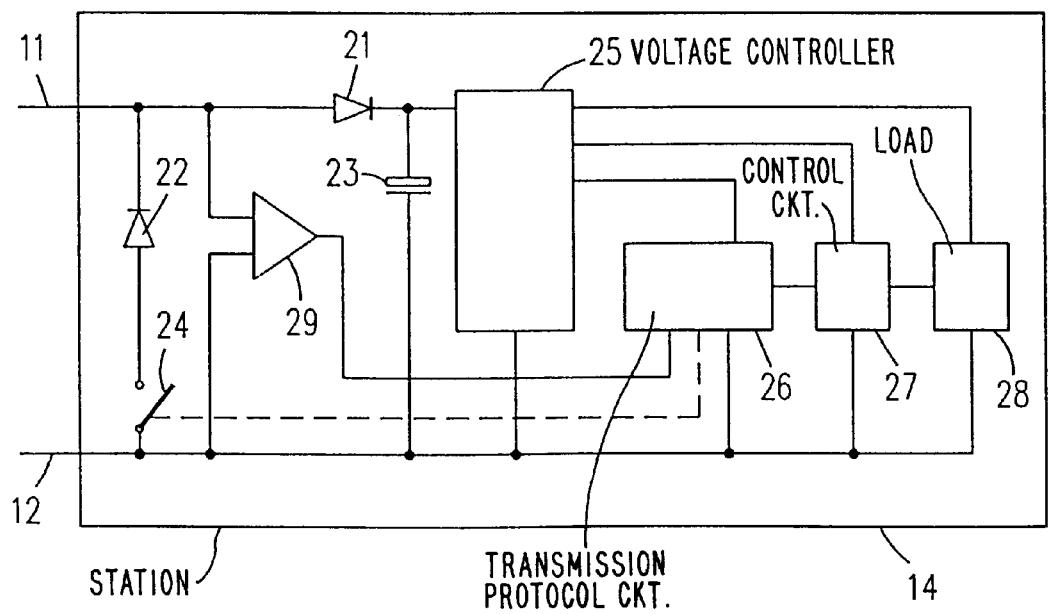
FIG. 2 shows a first embodiment of the construction of a station.

FIG. 2 shows the construction of one of the stations, for example the station 14, where a capacitor 23 is charged via a diode 21 during the positive half wave, from which capacitor the various components of the station are electrically supplied by means of a voltage controller 25, for example a circuit 26 for carrying out the data transmission protocol, a dedicated control circuit 27, and a dedicated load 28. The negative half wave may be simply amplitude-modulated by means of a switch 24 and a further diode 22 under the control of the datatransmission protocol circuit 26. The amplitude of the negative half wave is evaluated by a comparator 29 whose differential threshold voltage is negative, see also FIG. 3.

Figure 3:
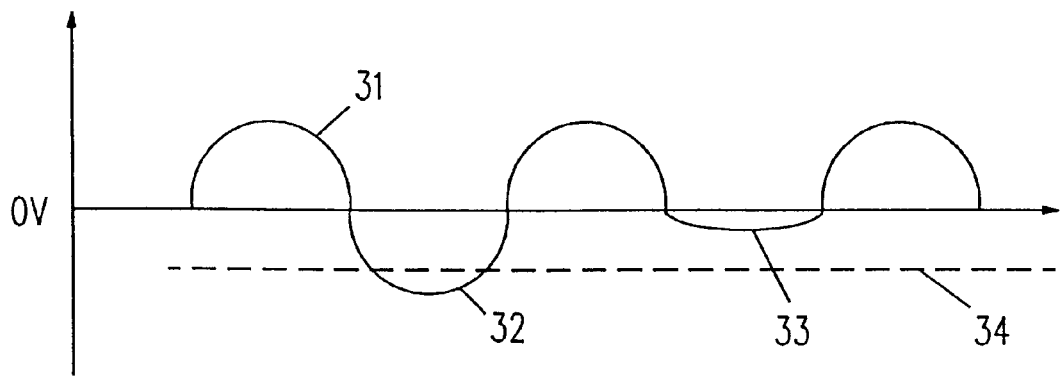
FIG. 3 shows an example of the voltage gradient on the two lines with data modulation.

FIG. 3 shows the principle of the voltage gradient in time. The positive half wave 31 serves for the electrical supply to the stations, the negative half wave 32 may have its amplitude modified by means of switches 24 in the stations. The comparator 29 in each station has a negative differential reception threshold 34 so that the amplitude modulation can be evaluated in the simple manner. For example, a phase of the negative half wave may represent a bit, the full amplitude—half wave 32—denoting the rest state or idle state, and the reduced amplitude—half wave 33—the active state. The active state is achieved through closing of the switch 24 in one or several stations, such that a simultaneous transmission from several stations takes place without interference, and all CSMA (Carrier Sense Multiple Access) protocols can be used in principle, as well as their Data Link Layer such as, for example, Ethernet, CAN, and J1850. The active state may then represent a logic bit 0 and the rest state a logic bit 1, or vice versa.

Since the individual bits are clearly demarcated in the stations by the relevant interposed positive half waves, simple protocols can be used which deal satisfactorily with a complete telegram without any mechanisms for synchronization and for a secure scanning of single bits, which are usually complicated and expensive. Very unsharp time references may also be used for the implementation of the protocol, since the circuit 26 for carrying out the data transmission protocol can scan each single bit in a reliable manner in that it interprets the phase between two positive half waves as one bit each time. Depending on the protocol used, the time references may even be entirely absent at the stations, because the cycle duration of the AC voltage itself can already serve as the time reference.

The AC voltage may also be a square-wave voltage or have some other shape, depending on the nature of the generator. It also possible for the positive half wave to be longer than the negative half wave for the purpose of a higher power transmission.

Figure 4:
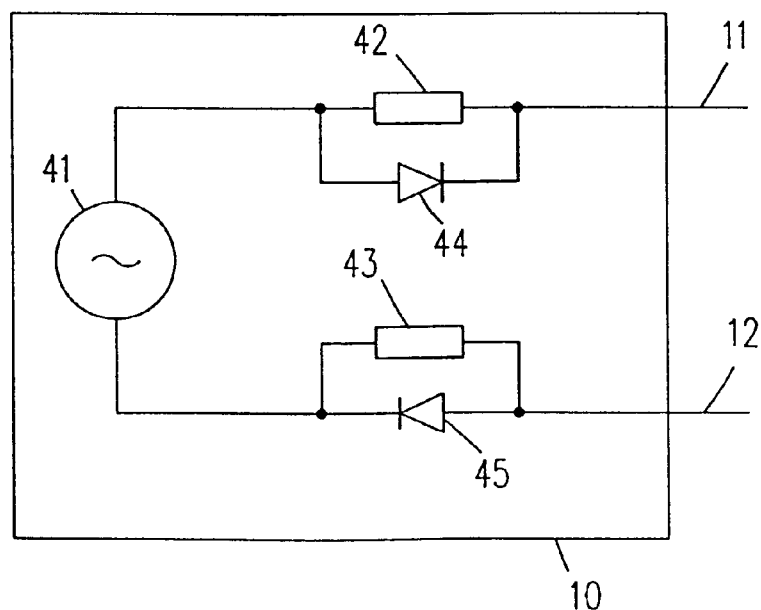
FIG. 4 shows a first embodiment of the construction principle of the power source.

FIG. 4 shows the construction principle of the generator. The generator comprises an AC voltage source 41. The negative half wave is provided at a higher ohmic value than the positive half wave, so that the switches 24 in the stations can be realized as low-power semiconductor switches. This is realized by means of series resistors 42, 43 which are connected in parallel to diodes 44, 45 so that the positive half wave remains low-ohmic. In this embodiment, one of the resistors with its parallel diode may also be omitted, i.e. be replaced by a short-circuit, so that one terminal of the generator 41 is directly connected to the conductor 11 or 12. The generator may be an alternately switched H-bridge of semiconductor switches in the simplest case.

Figure 5:
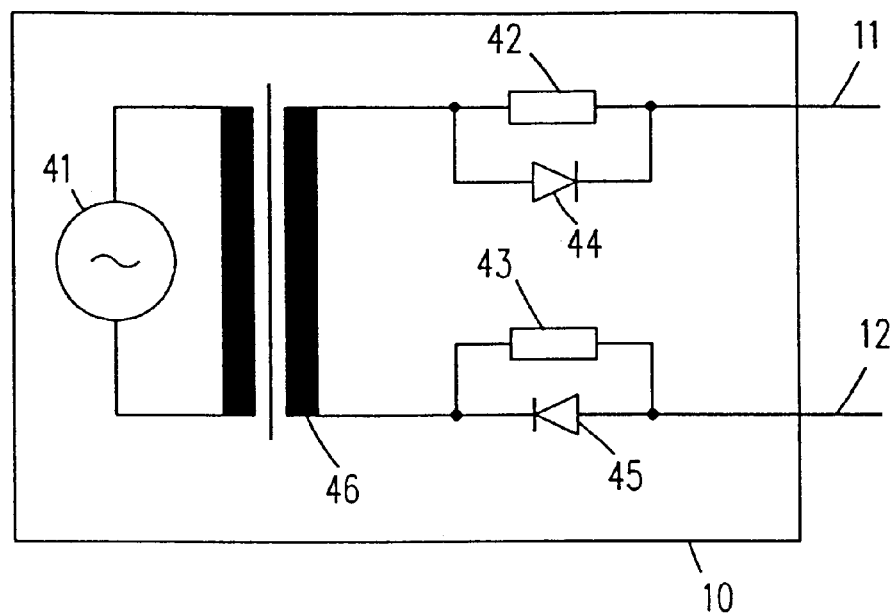
FIG. 5 shows the construction of a power source with a transformer.

FIG. 5 shows the generator with the use of an additional transformer 46. The transformer is optional. The principle of the electrical supply and the data transmission through two lines also works without transformer. The transformer, however, provides four further advantages. Firstly, the two half waves are rendered symmetrical and the interference radiation is thus minimized. Secondly, the primary voltage amplitude can be changed into the voltage required for the application through transformation to the secondary voltage amplitude. Thirdly, the AC voltage can be generated from a unipolar voltage source in a very simple manner. Fourthly, the AC voltage may be supplied without reference to the ground potential, so that a short-circuit of a conductor with some other potential, such as ground, or some other supply voltage is acceptable.

Figure 6:
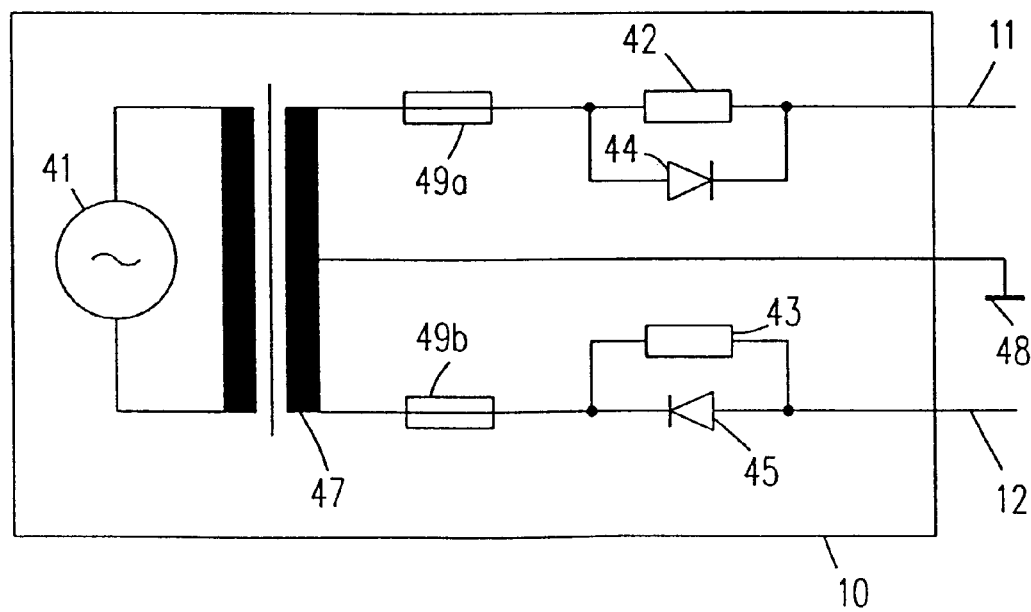
FIG. 6 shows the construction of a power source with a transformer having a central tap at the secondary side for a three-line system.
Figure 7:
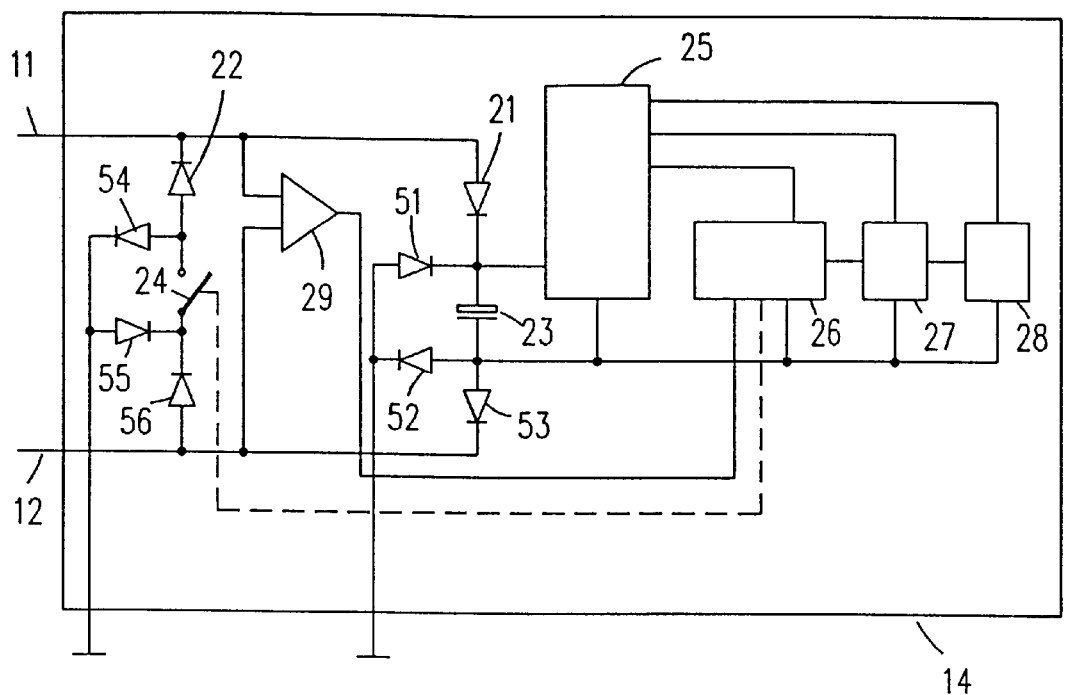
FIG. 7 shows a further embodiment of the construction of a station which is particularly suitable for the three-line system.

In a further embodiment of the system, the generator and station are somewhat expanded so as to accommodate interruption defects. FIG. 6 shows the expanded generator in which a transformer 47 with a central tap is used, which tap is connected, for example, to the system ground 48. The expanded station in FIG. 7 is provided with further diodes. If there is an interruption defect in the line 11, the station can still be supplied from the positive half wave, albeit with half the secondary voltage only, via a current path from the system ground through diode 51, capacitor 23 and loads connected in parallel therewith, diode 53, and conductor 12. Similarly, the amplitude of the negative half wave can still be modified by means of switch 24 for the transmission of data, i.e. via the current paths of conductor 12, diode 56, switch 24, diode 54, and system ground. The principle is the same for an interruption in conductor 12. The current path for the supply from the positive half wave then runs through diodes 21 and 52. The current path for data transmission runs through diodes 55 and 22.

These back-up modes of operation arise automatically without any active switch-over in the stations or in the generator. The transmission remains a differential one for both half waves in the back-up modes, although usually the desired effect of a minimized interference radiation is no longer achieved because of the different properties of the conductive lines and system ground and the asymmetry of the voltage gradient in time in the two lines arising therefrom. In addition, the tolerance to short-circuit defects in lines 11 and 12 is limited in systems having this expanded construction for tolerating interruption defects, because the alternative current path via system ground constitutes a grounding, and a short-circuit of one of the lines 11 and 12 with, for example, ground will short-circuit the secondary winding.

This latter disadvantage may be eliminated as shown in FIG. 6 a short-circuit protection of the generator, which has to be realized anyway, is constructed, for example, as a precision fuse 49a and 49b, so that a short-circuit defect activates the fuse and thus acts as an interruption defect, which is already allowed for by the arrangement provided. It is possible in this manner to tolerate either a short-circuit defect or one or several interruption defects in one conductor.

Figure 8:
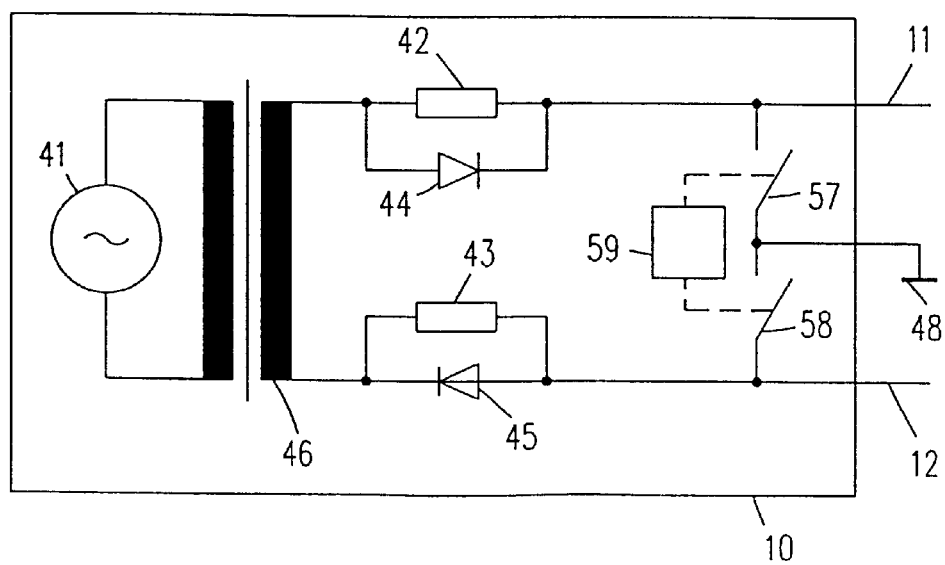
FIG. 8 shows the construction of a power source for a three-line system in which the third line is used in the case of defects only.

In an alternative embodiment of the system, the interruption defects are accommodated in a somewhat different manner. The stations are constructed in the same way as in FIG. 7, but the generator is constructed without central tap at the transformer, as shown in FIG. 8, and has additional switches 57 and 58 which are controlled via the control circuit 59. The control circuit 59 can close the two switches alternately when an interruption defect has been detected, for example in the case of a communication failure with a station, until this communication is restored again. This embodiment requires positive actions for tolerating the defect, unlike the embodiment described above. However, these actions are centrally controlled once and for all, the stations themselves need not take any action. This is still very advantageous compared with other, known defect-tolerant systems in which, for example, the actions are to be carried out at all stations and also in synchronism with one another in accordance with ISO11992, until it has been ascertained in a series of communication trials which of the lines are still available for use.

A further advantage of this embodiment is that at least short-circuit defects to ground can be tolerated without any measures here because the ground connection is not present when switches 57 and 58 are open. The precision fuses are accordingly absent in this embodiment. Short-circuit defects or interruption defects can be accepted, the control circuit 59 ascertaining, for example by voltage scanning, the absence of a possibly simultaneously arising short-circuit before a switch 57 or 58 is closed.

A further advantage of this embodiment is that the full voltage sweep is available again to the stations in the case of an interruption defect after ground potential has been applied to the respective, correct conductors at the generator side, whereas only half the peak value is available in the embodiment described above with a central tap at the transformer. It is accordingly not necessary to overdimension the supply—anticipating any defect condition—, which leads to a more efficient conversion operation.

Figure 9:
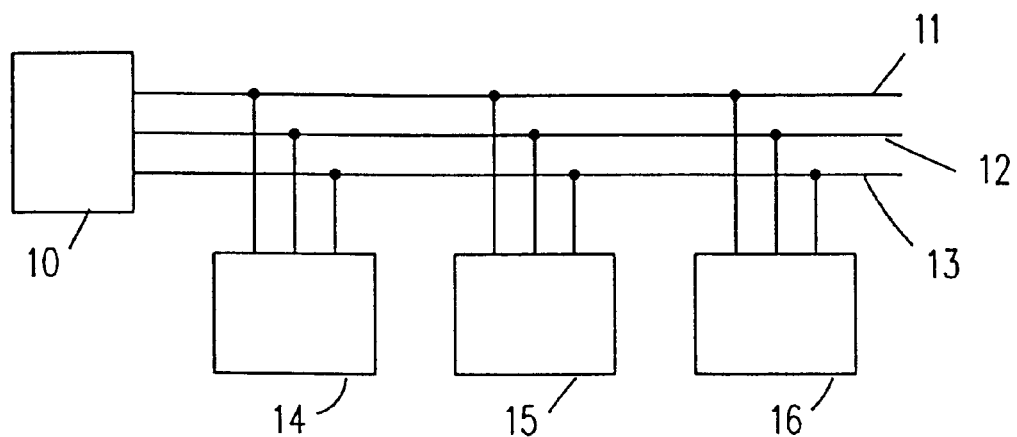
FIG. 9 shows the construction of a system with three lines, where all three lines are independent of a ground connection.

The disadvantage of an increased interference radiation in the case of defects remains in both embodiments which tolerate interruption defects. This can be eliminated through a small additional provision when, as shown in FIG. 9, a third conductor 13 is laid parallel to conductors 11 and 12 instead of the system ground. The desired effect of a minimized interference radiation also in the back-up mode of operation is the result again because the operation remains strictly differential. The use of the alternative conductor 13 instead of the system ground in the one embodiment of the system in addition provides a simultaneous tolerance of interruption defects and of a short-circuit of a conductor because the conductor 13 is also operated free from ground potential. In addition, a short-circuit between conductors is also tolerated, i.e. between the conductors 11 and 13 or the conductors 12 and 13, provided the generator is protected against short-circuits. The advantage of the tolerance of a short-circuit between one conductor with either ground or another supply potential and simultaneously of one or several interruption defects in one conductor is also obtained in the other further embodiment of the system. Short-circuits between conductors 11 and 13 or between 12 and 13 are tolerated in this case as well.

Figure 10:
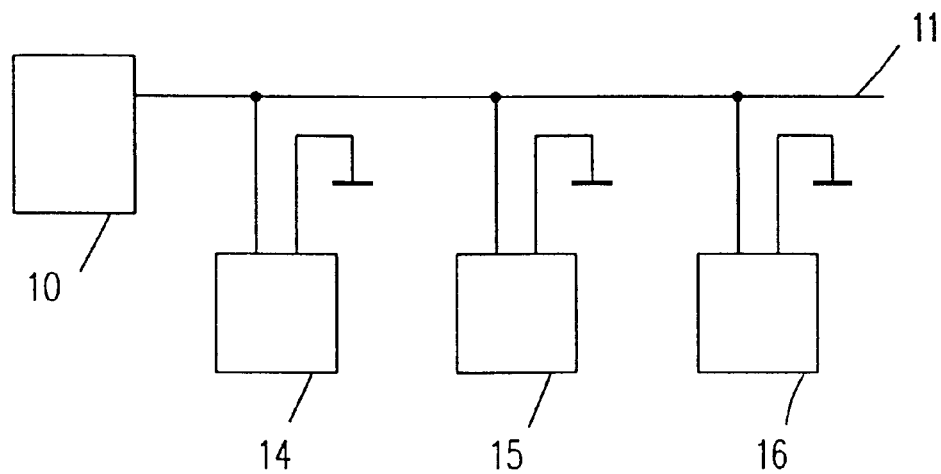
FIG. 10 shows the construction of a system with only a single line, in which the ground connection is used as the return line.

The minimal-cost embodiment of the invention shown in FIG. 10 is given by way of contrast to the embodiment of the invention described above which is highly tolerant to defects. The transmission of power and data can be achieved with only a single conductor and an additional connection to the system ground in systems where an increased interference radiation is acceptable and a defect tolerance is not required, so that only one conductor, for example conductor 11, need be installed, which is very inexpensive. The other conductor, for example conductor 12, is replaced by the system ground. In this embodiment, moreover, a resistor and a diode can be dispensed with for the generator.

The invention can thus be optimally used for certain applications as regards the achievable cost reductions and the required tolerance to defects. If at least some of the stations should still remain capable of operation in those embodiments which are of a simpler circuit construction, for example in accordance with FIGS. 1 to 5 and 10, separation units can be inserted in at least one conductor, automatically disconnecting the short-circuited portion following the separation unit, as seen from the generator, and automatically connecting it again after the short-circuit has been eliminated.

Figure 11:
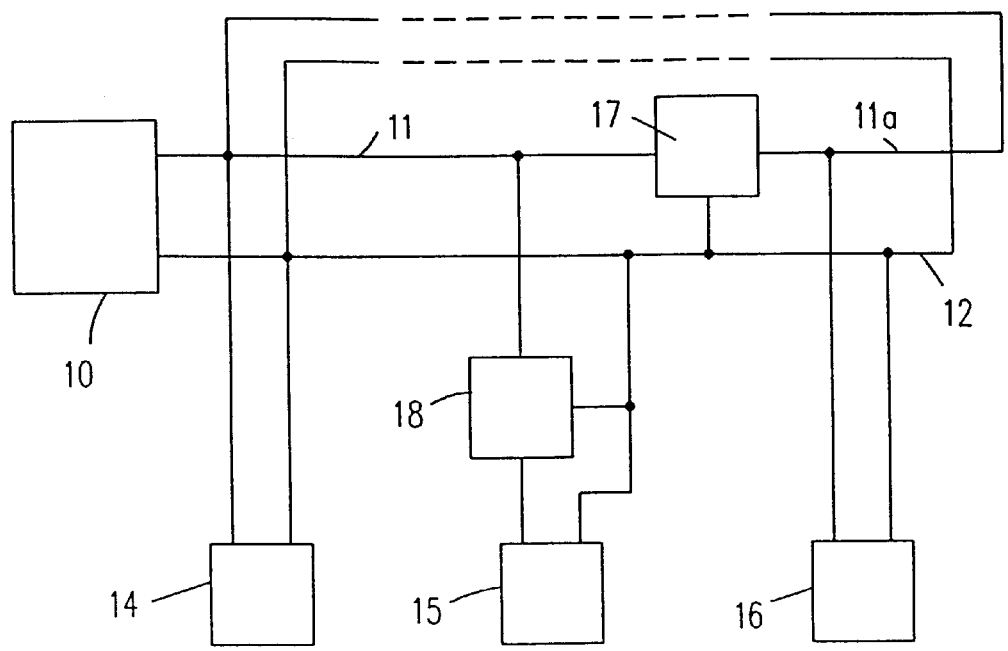
FIG. 11 is a block diagram showing the use of separation units.

FIG. 11 shows a system in which separation units for the disconnection of entire system blocks (separation unit 17) are provided in the lines 11 and 12 for the stations 14, 15 and 16, or in the supply line to a station for cutting off only this station (separation unit 18). Reference numeral 11a denotes that conductor portion which follows the separation unit as seen from the generator 10 and which is disconnected from the remainder of the system in case of a short-circuit or overload, together with all stations connected to this conductor portion. It is assumed in FIG. 11 that the lines 11 and 12 are connected in a ring arrangement and are returned again to the generator 10. Further separation units (not shown) are present in this ring, such that at least one station is present between two separation units each time. If a short-circuit arises in a conductor portion between two separation units, only the stations present in this conductor portion will be disconnected, whereas the rest of the system remains fully operational.

Figure 12:
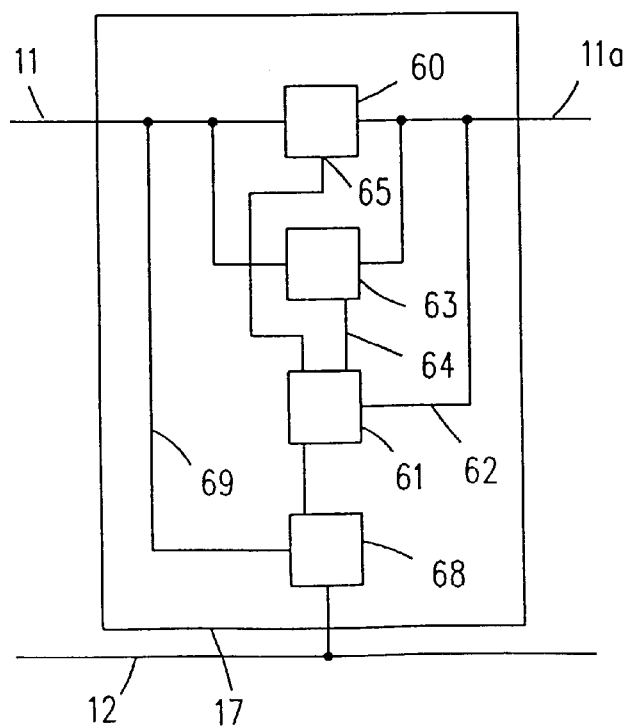
FIG. 12 is a block diagram of the separation unit in the line having the higher potential.

FIG. 12 is a block diagram representing a separation unit 17 which is connected in the line 11. This separation unit 17 comprises a switch 60, a test resistor 63, and monitoring units 61 and 68, the monitoring unit 68 being connected in series with the monitoring unit 61 and achieving the connection between the control input 65 and the non-interrupted line 12. The potential of the conductor portion 11a of the switch 60 is tested at the output by means of the test line 62 of the monitoring unit 61, and the potential of the conductor portion 11 is tested at the input of the switch 60 by means of the test line 69 of the monitoring unit 68. The test resistor 63 is controlled via the control input 64 of the monitoring units 61 and 68.

Figure 13:
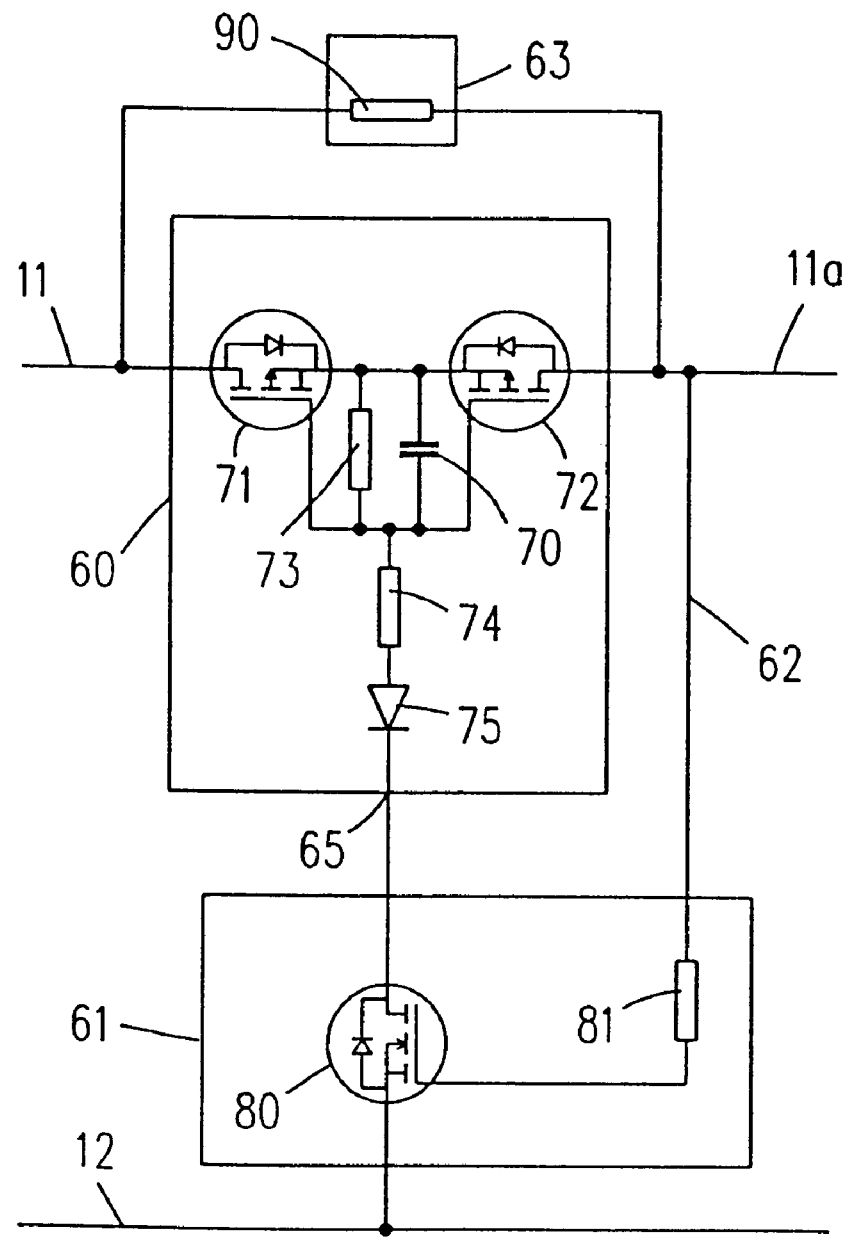
FIG. 13 is a detailed circuit diagram of a separation unit.

FIG. 13 shows a circuit arrangement for realizing a separation unit in accordance with FIG. 12. This arrangement comprises p-channel power transistors 71, 72 and resistors 73, 74 as well as a capacitor 70 and a diode 75 in the switch 60, and an n-channel control transistor 80 and a resistor 81 in the monitoring unit 61. The capacitor 70 is arranged between the junction point of the two sources of the power transistors 71 and 72 of the switch 60 and the junction point of the interconnected gates of the power transistors 71 and 72. The test resistor 63, acting as a current-limiting element which shunts the switch 60, is not controlled in this example and accordingly comprises merely the simple ohmic resistor 90.

Only a scanning of the line 11a at the output of the switch 60 is carried out here with no more than one monitoring unit 61. A test line 62 of the monitoring unit 61 for triggering of the control transistor 80 via the resistor 81 scans the potential of the line 11a at the output of the switch 60. The switch 60 is included in the line 11, and the gates of the two power transistors 71 and 72 are connected to the control input 65 via the voltage divider comprising the resistors 73 and 74. A capacitor 70 is charged via the resistor 74 and the diode 75 only if a potential lower than the potential of the line 11 is applied to the control input 65, and in that case the power transistors 71 and 72 become conducting. During the negative half wave of the AC voltage, when the potential of the line 11 is lower than the potential of the line 12, the diode 75 prevents a reverse charging of the capacitor 70, so that the voltage required for closing the power transistors 71 and 72 is maintained. The discharging of the capacitor 70 via the resistor 73 is to be so adjusted that no excessive change in the charge condition of the capacitor 70 occurs during the negative half wave.

The potential of the line 11 at the input of the switch 60 is conducted to the output of the switch 60 and to the line portion 11a via the test resistor 63 when the power transistors 71 and 72 are open. This potential is scanned by means of the test line 62 and supplied to the control input of the monitoring unit 61 and therein via the resistor 81 to the gate of the control transistor 80. When the potential of the test line 62 exceeds a first triggering threshold, the control transistor 80 in the monitoring unit 61 is closed. The monitoring unit supplies the potential of the line 12 to the control input 65 of the switch 60, so that the voltage drop across the resistor 73 closes the power transistors 71 and 72. The uninterrupted normal operation of the separation unit is achieved in this manner.

If there is a short-circuit or an overload between the lines 11a and 12 at the output of the separation unit, the potential conducted via the test resistor 63 to the line portion 11a comes below the triggering threshold at the test input 62 of the monitoring unit 61 as required for closing the control transistor 80, and the control transistor 80 of the monitoring unit 61 becomes non-conducting. As a result, the control input 65 cannot be connected to the potential of the line 12, and the voltage necessary for closing the power transistors 71 and 72 cannot be built up, so that the power transistors 71 and 72 are non-conducting and the switch 60 remains open. The supply generator 10 (FIG. 1) and all stations not connected to this line portion 11a are separated from the short-circuit thereby.

A test condition is created via the connection of the test resistor 63. When the short-circuit or the overload is eliminated, the potential can build up again across the test resistor and exceed the triggering threshold, so that the control transistors 80 and 80a connect the potential of the line 12 through again, and the power transistors 71 and 72 become conducting and the switch 60 is closed, whereby normal operation is automatically reinstated.

The circuit arrangement of FIG. 13 recognizes direct short-circuits, short-circuits across resistors, and short-circuits with diodes which are active in the positive half wave, but not short-circuits with diodes which are active in the negative half wave, i.e. with the anode connected to line 12 and the cathode to line 11. An embodiment for this case will be described further below.

Figure 14:
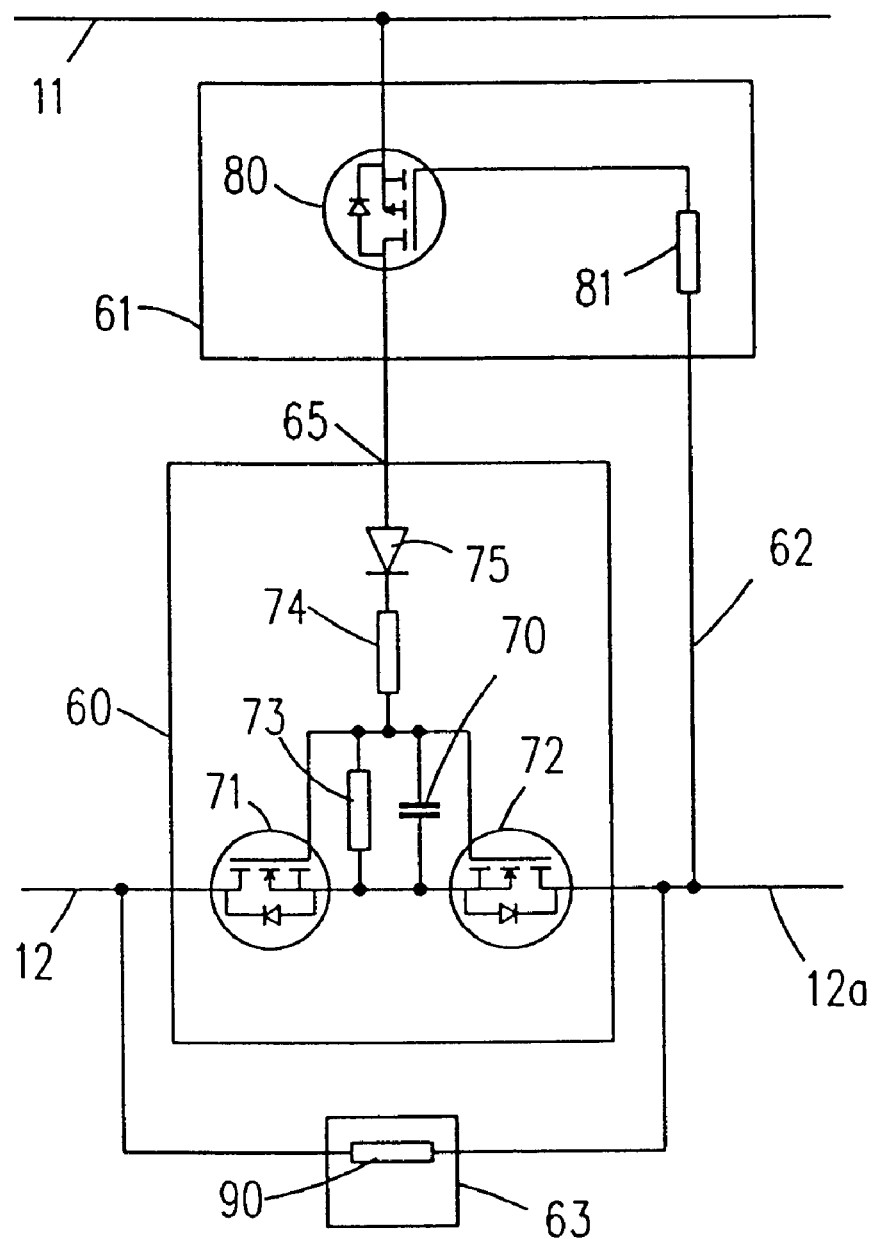
FIG. 14 is a detailed circuit diagram of a separation unit with transistors of opposed conductivity types.

FIG. 14 shows an embodiment of a separation unit wherein the switch 60 is included in the line 12 which has the lower potential during the positive half wave. In this example, again, only one scanning of the line 12a at the output of the switch 20 is shown. The test resistor 23 is not controllable also in this embodiment, containing only a single ohmic resistor 50.

The n-channel power transistors 71 and 72 in the switch 60 are conducting only if a potential higher than the potential of the line 12 is applied to the control input 65. The monitoring unit 61 comprises a p-channel control transistor 80 by which the potential of the line 11 is passed on to the control input 65. This through connection is achieved in dependence on the potential of the line portion 12a which is scanned by the test line 62 at the output of the switch 60. During switching-on, the potential of the line 12 at the input of the switch 60 is conducted via the test resistor 63 to the output of the switch 60 when the power transistors 71 and 72 are non-conducting. This potential is scanned with the test line 62 and conducted to the control input of the control transistor 80 of the monitoring unit 61. The control transistor 80 is closed when the potential passes above a triggering threshold. This connects the control input 65 of the switch 60 to the potential of the line 11, which drives the power transistors 71 and 72 into the conducting state and initiates the normal operation of the separation unit. When a short-circuit or an overload occurs between the lines 11 and 12, the potential at the line portion 12a does not reach the value of the triggering threshold which is necessary for closing the control transistor 80, and the control transistor 80 remains non-conducting. The control input 65 is thus no longer connected to the potential of the line 11, and the voltage necessary for closing the power transistors 71 and 72 cannot be established. The generator 10 (FIG. 1) is separated from the short-circuit in this manner. The test condition is achieved via the test resistor 63. When a short-circuit occurs during operation, the potential at the line portion 12a sinks below the triggering threshold value, the control transistor 80 becomes non-conducting, and the switch 60 interrupts the line 12. When the short-circuit between the lines 11 and 12a is eliminated again, the potential of the line portion 12a at the output of the switch 60, and thus at the test line 62 of the monitoring unit 61, can again assume a value above the triggering threshold for closing the control transistor 80 of the monitoring unit 61, and restore normal operation automatically.

The arrangement of FIG. 14, again, does not recognize short-circuits with diodes which are active in the negative half wave of the AC voltage.

The separation units shown in FIGS. 13 and 14 may also be used for recognizing short-circuits occurring in the negative half wave of the AC voltage in an analogous manner. In this case, the separation unit of FIG. 13 must be included in the line 12, because the latter has the higher potential during the negative half wave, and the separation unit of FIG. 14 must be included in the line 11, since the latter has the lower potential during the negative half wave. Short-circuits with a diode active in the positive half wave are not recognized in these embodiments.

The examples of FIGS. 13 and 14 each provide only one scanning at the output of the switch 60. The circuits, however, may be complemented with a monitoring unit 68 for scanning also at the input of the switch 60 of FIG. 12. The monitoring units should be connected in series in that case.

Figure 15:
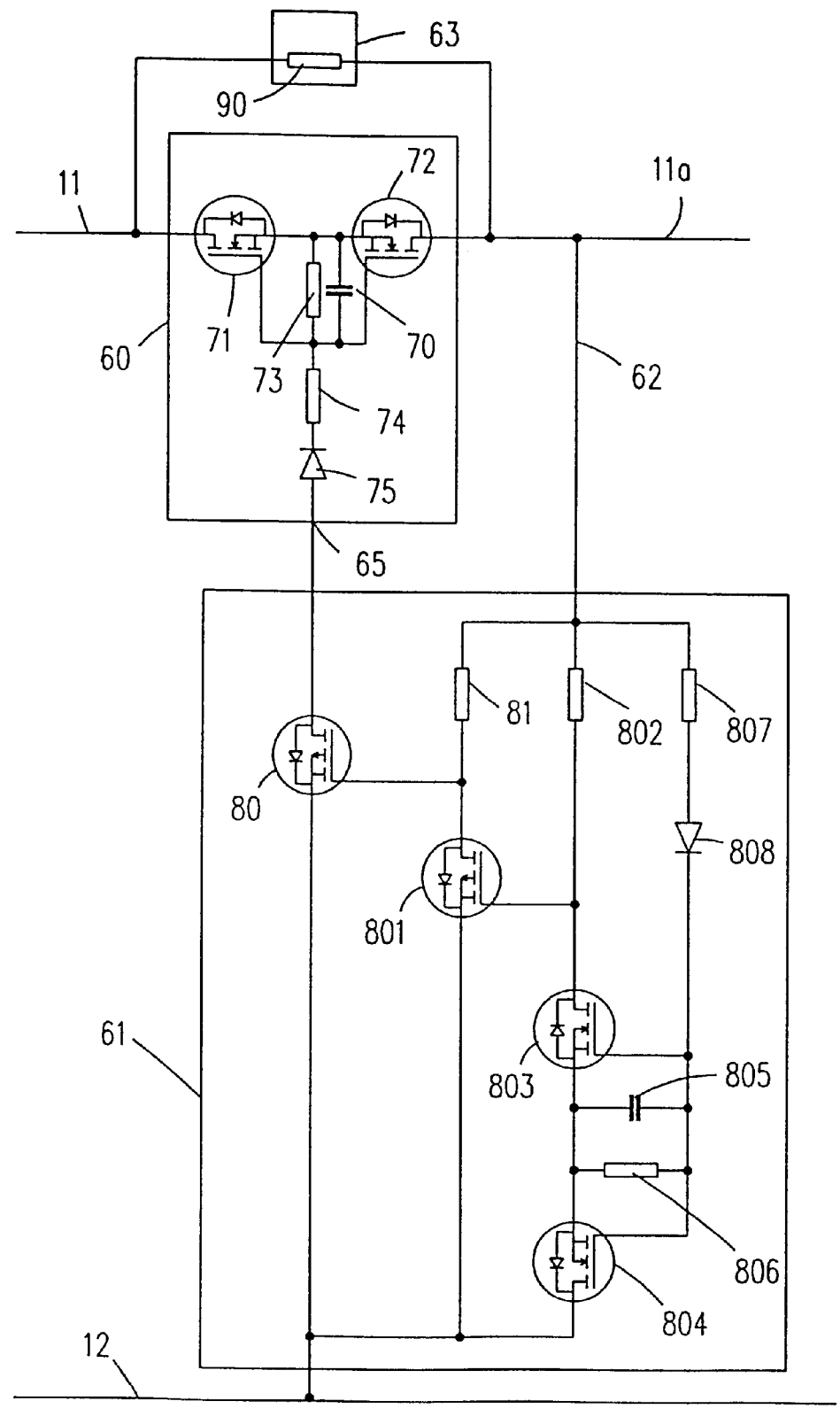
FIG. 15 is a circuit diagram of a separation unit, supplemented with elements for recognizing short-circuits in both half waves.

FIG. 15 shows an embodiment in which the potential of the line 11 is higher than the potential of the line 12 during the positive half wave, while during the negative half wave the potential of the line 11 is lower than the potential of the line 12. The circuit of FIG. 14 is the starting point for the circuit of FIG. 15, in which also n-channel transistors 71 and 72 are used in the switch 60. The switch 60 comprises a capacitor 70 and a diode 75 for storing the charge which is necessary for the conducting state of the power transistors 71 and 72 during the positive half wave. The control transistor 80 of the monitoring unit 61 is a p-channel transistor, as in FIG. 14.

With the monitoring unit 61 without the elements 801 to 808, short-circuits in the negative half wave only are recognized, because the control transistor 80 must be triggered with a negative gate-source voltage in order to be conducting. To render this monitoring unit 61 suitable also for short-circuits which act only in the positive half wave, the monitoring unit 61 is augmented with a circuit comprising the switches 801, 803, and 804, the resistors 802, 806, and 807, the capacitor 805, and the diode 808, for recognizing the short-circuit condition via a diode whose anode is connected to the line 11 and whose cathode is connected to the line 12, during the positive half wave, so as to be able to control the switch 60 accordingly. When the power transistors 71 and 72 are conducting, the capacitor 805 is charged to a positive value during the positive half wave via the current path: resistor 807→diode 808→resistor 806→diode in switch 804. The diode 808 prevents a discharging during the negative half wave. The capacitor 805 thus retains a voltage at which the switches 803 and 804 close. Discharging via the resistor 806 during the negative half wave is so dimensioned that the capacitor 805 can discharge to a low degree only during a single cycle duration, while charging via the resistor 807 can take place during a positive half wave. The continuously closed switches 803 and 804 keep the switch 801 always open, so that the control transistor 80 operates normally during the negative half wave in a manner analogous to that of the circuit of FIG. 14.

If the potential of the line 11 becomes lower than the potential of the line 12 during the negative half wave, the p-channel transistor 80 will receive a negative gatesource voltage, so that it becomes conducting. In this condition, the capacitor 70 of the switch 60 can be charged via the current path: switch 80→diode 75→resistor 74→resistor 73→diode in the power transistors 72 and 71. A positive gate-source voltage thus arises for the power transistors 71 and 72, so that they both become conducting and the switch 60 is closed. Discharging of the capacitor 70 via the resistor 73 is so dimensioned that the potential across the capacitor 70 changes only little over the duration of a cycle. The capacitor 70 is charged via the resistor 74 in the duration of a negative half wave.

Short-circuits which lead to the same effect during both half waves are direct (low-ohmic) short-circuits and short-circuits across a resistor between the lines 11 and 12, while the resistance value depends on the dimensioning of the separation unit. If a direct short-circuit or a short-circuit across a resistor occurs at the output of the separation unit between the lines 11 and 12, the control transistor 80, which is normally closed during the negative half wave, is opened. The control transistor 80 is always open during the positive half wave. As a result, the control input 65 is not connected to the potential of the line 12 at any time any more, and the capacitor 70 is discharged via the resistor 73. The positive gatesource voltage for the power transistors 71 and 72 can thus not build up, so that the power transistors 71 and 72 become non-conducting. The generator 10 (FIG. 1) is thus separated from the short-circuit, and the test condition with the connection via the test resistor 63 is established. The circuit portion with the switches 803, 804, and 801 is immaterial to this situation with a direct short-circuit.

Short-circuits which occur only in the negative half wave, i.e. via diodes whose anodes are connected to line 12 which has the higher potential during the negative half wave and whose cathodes are connected to line portion 11a which has the lower potential during the negative half wave, lead to the same situation as in the case described above, because the control transistor 80 remains non-conducting during the negative half wave on account of the short-circuit and the control transistor 80 is always non-conducting during the positive half wave. The capacitor 805 is not charged via the resistor 807 and the diode 808 in the case of short-circuits which occur only in the positive half wave, i.e. via diodes whose anodes are connected to the line 11 which has the higher potential during the positive half wave and whose cathodes are connected to the line 12 which has the lower potential during the positive half wave. The capacitor 805 is discharged via the resistor 806, and the switches 803 and 804 always remain open. During the positive half wave, the control transistor 80 and the switch 801 remain open at all times or are non-conducting. Upon the transition to the negative half wave, the switch 801 is closed, so that the control transistor 80 is given a gatesource voltage below its switching-on threshold and thus remains non-conducting also during the negative half wave. The control input 65 is thus no longer connected to the potential of the line 12 at any time, and the capacitor 70 is discharged via the resistor 73. The power transistors 71 and 72 are non-conducting, and the switch 60 is open. The generator 10 (FIG. 1) is thus separated from the short-circuit and the test condition is obtained by means of the sole connection via the test resistor 63. If a short-circuit occurs during operation, the monitoring unit 61 detects short-circuits between the lines 11a and 12 in the manner described above, and the power transistors 71 and 72 of the switch 60 are quickly opened. When the short-circuit between the lines 11a and 12 is eliminated again, the potential at the output of the switch 60 can again assume a value via the test resistor 63, and thus at the test line 62 of the monitoring unit 61, at which the control transistor 80 is conducting and normal operation is automatically reinstated.

The arrangement of the switch 60 in the line 11, which has a lower potential than the line 12 only during the negative half wave, means that all short-circuits occurring during the negative half wave are detected with the control transistor 80 of the monitoring unit 61. The additional circuit comprising the switches 804, 803, and 801 in the monitoring unit 61 in addition detects those short-circuits which occur in the positive half wave.

If in contrast to the arrangement shown in FIG. 15 the switch 60 comprising n-channel transistors is arranged in the line 12, which has the lower potential only during the positive half wave, while the monitoring unit 61 represents the connection to the line 11 via the p-channel control transistor 80, then the control transistor 80 of the monitoring unit 61 detects all short-circuits which occur during the positive half wave. The additional circuit comprising the switches 804, 803, and 801 in the monitoring unit 61 recognizes the further short-circuits which may occur in the negative half wave.

Another, similar embodiment may be indicated on the basis of the principle of the circuit arrangement of FIG. 13. The switch 60 comprises p-channel transistors in line 11, and the control transistor 80 is an n-channel transistor. With the switch 60 in the line 11, which has the higher potential only during the positive half wave, all short-circuits occurring during the positive half wave are now detected by means of the control transistor 80 of the monitoring unit 61 which forms the connection to line 12. The additional circuit comprising the switches 804, 803, and 801 in the monitoring unit 61 detects the further short-circuits which may arise in the negative half wave. The switches 71, 72, 704, and 803 are then constructed as p-channel transistors, and the switches 80 and 801 as n-channel transistors.

If the switch 60 comprising two p-channel transistors is included in line 12, which has the higher potential only during the negative half wave, all short-circuits occurring during the negative half wave are detected with the control transistor 80 of the monitoring unit 61 which forms the connection to the line 11. The additional circuit comprising the switches 804, 803, and 801 in the monitoring unit 61 then detects the further short-circuits which may arise in the positive half wave. The switches 71, 72, 804, and 803 re then constructed as n-channel transistors, and the switches 80 and 801 as p-channel transistors.

The embodiments just mentioned faultlessly recognize all three kinds of short-circuits mentioned, while in the case of a short-circuit via a resistor the value of the resistance which is still regarded as a short-circuit depends on the value of the test resistor 90 and the current which flows during normal operation.

A further possibility for detecting short-circuits at an AC voltage and for controlling a power transistor is to provide one separation unit for the negative half wave and one for the positive half wave. For the positive half wave, when the potential of the line 11 is higher than the potential of the line 12, a switch 60 in accordance with FIG. 13 is provided in the line 11, or in accordance with FIG. 14 in the line 12. For the negative half wave, when the potential of the line 11 is lower than the potential of the line 12, a switch 60 in accordance with FIG. 13 is provided in the line 12, or one in accordance with FIG. 14 in the line 11. Both separation units must be functionally connected in series, so that data and power of the generator 10 can only be connected through when both separation units have detected no short-circuit. This arrangement requires a larger number of power transistors, this in contrast to the arrangement of FIG. 15.

Figure 16:
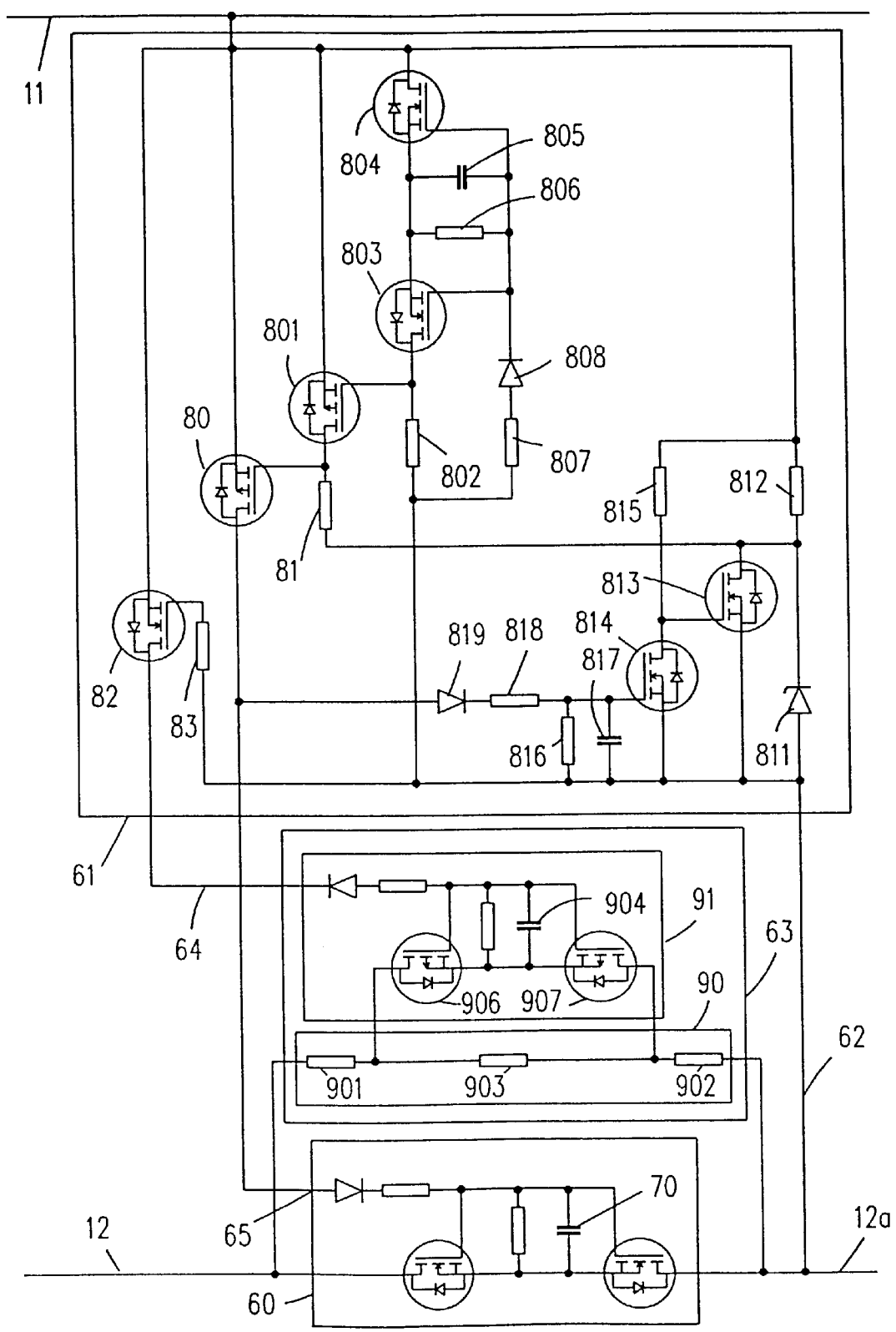
FIG. 16 is a circuit diagram of a separation unit supplemented with elements for generating a hysteresis for the triggering threshold.

FIG. 16 shows an embodiment in which the switch 60 is included in the line 12 in accordance with the basic arrangement of FIG. 14. The monitoring unit 61 now detects with the control transistor 80 all short-circuits which occur during the positive half wave, and with the switches 801, 803, and 804 the further short-circuits which occur during the negative half wave. To increase the detection reliability for short-circuits during the positive half wave, a hysteresis is provided for the triggering threshold of the control transistor 80. A high triggering threshold obtains during normal operation of the separation unit with the switch 60 closed so as to be able to open the switch 60 quickly, with the purpose of avoiding an overload on the generator 10 (FIG. 1), when the voltage at the output of the separation unit drops, which voltage is scanned with the test line 62 via the resistor 81 during the positive half wave. When the switch 60 is open, however, a low triggering threshold obtains so that a faultless testing for short-circuits during the positive half wave can be achieved via the high-ohmic test resistor 63, and the normal load of other stations in the system cannot simulate a short-circuit.

This hysteresis is achieved by means of the switches 813 and 814 and the zener diode 811. When the control transistor 80 is conducting during the positive half wave, the switch 60 is also closed. This information is utilized for keeping the switch 814 closed in that the capacitor 817 charges itself via the control transistor 80, the diode 819, and the resistor 818 during the positive half wave. This charge condition is maintained during the negative half wave, because the discharging via the resistor 816 is set so low that the charge condition hardly changes. The switch 813 is kept open by the closed switch 814, and the zener diode 811 thus determines the triggering threshold for switching of the control transistor 80. The adjustment of the triggering threshold must safeguard then that the control transistor 80 is closed so long during the positive half wave that the capacitors 70 and 817 in the switch 60 and in the hysteresis definition circuit of the monitoring circuit 61 can become sufficiently charged. If the control transistor 80 is non-conducting during the positive half wave, the switch 60 is also open, and there will only be a connection between the input and the output of the switch 60 via the test resistor 63. This information is utilized for adjusting the triggering threshold for the control transistor 80 during the positive half wave to a low voltage value in that the capacitor 817 is discharged via the resistor 816, and the switch 814 is opened. This closes the switch 813 during the positive half wave, so that the zener diode 811 is shunted.

To improve the disconnection properties in the transmission of power and/or data by the switch 60, the test resistor 63 must not assume a too low ohmic value. A conflicting requirement is that a minimum voltage level must be present at the output of the switch so as to recognize reliably the normal situation, i.e. no short-circuit. In the case of large loads, i.e. a low load resistance behind the switch, the test resistor must be chosen to be correspondingly low-ohmic. In the system described, which transmits power during the positive half wave and accordingly has a low-ohmic load, and which transmits data during the negative half wave and is accordingly given a higher-ohmic load, there is the possibility to adjust the value of the test resistor 63 in dependence on the situation. For this purpose, the status of the line 12a at the output of the switch is scanned during the negative half wave with the switch 82 of the monitoring unit 61 via the resistor 43 and the test line 62. If the negative half wave is capable of building up normally, the switch 82 is closed, and the shunting capacitor 904 in the control unit 91 of the test resistor 63 is charged via the control line 64. The charge condition is retained during the positive half wave and thus keeps the switch comprising the transistors 906 and 907 in the control unit 91 continually closed, so that the partial resistor 903 of the resistor unit 90 is shunted. This renders the portion of low ohmic value of the test resistor 63, comprising the partial resistors 901 and 902, active between the input and the output of the separation unit. If the negative wave is incapable of building up, i.e. in the case of a short-circuit between the lines 11 and 12a, the switch 82 is not closed, and then the switch comprising the transistors 906 and 907 in the control unit 91 of the test resistor 63 cannot close either, so that the partial resistor 903 is not shunted. This renders the sum of the partial resistance values 901, 902, and 903 of the test resistor 63 active between the input and the output of the switch 60.

A two-stage switching-on of the separation unit is achieved by means of this arrangement, i.e. a short-circuit test is first made during the negative half wave with the high-ohmic test resistor 63. Direct short-circuits, short-circuits via a low-ohmic resistor, and short-circuits via a diode whose anode is connected to line 12 and whose cathode is connected to line 11 are recognized thereby. Only when such short-circuits are not present, a switch is made to a test resistor of lower ohmic value, which renders it possible to detect a short-circuit via a diode whose anode is connected to line 1 and whose cathode is connected to line 12, during the positive half wave. When the switch 60 is open, there is a high-ohmic connection between the input and the output of the switch 60 during the positive half wave via the test resistor 63, i.e. a satisfactory decoupling of the still operational system from those system portions which are hit by the short-circuit. The sum of the partial resistance values 901, 902, and 903 of the test resistor 63 is so dimensioned that a sufficiently strong signal arises at the output of the switch 60 for the high-ohmic negative half wave, so that normal operation and any short-circuit which may be present can be reliably distinguished. Similarly, the sum of the constituent resistance values 901 and 902 must be such that normal operation and a short-circuit during the positive half wave can be reliably distinguished.

In these embodiments, n-channel and p-channel transistors were used in the monitoring units 61 and 68 for detecting a short-circuit and for switching the control input of the switch 60. The use of such transistors constitutes no more than one possible embodiment by means of which a short-circuit can be recognized in a simple and reliable manner. Other possibilities are formed by the use of, for example, voltage comparators and similar components. The switches may be alternatively constructed with bipolar transistors.

What is claimed is:

1. A system comprising at least two stations which are interconnected by means of at least two conductors for the transmission of data and power, and comprising a power source coupled to said conductors, characterized in that the power source is designed for delivering a bipolar AC voltage having pulses of a first and a second polarity to the conductors, in that means for absorbing and storing power exclusively from the pulses having the first polarity are provided in each station without its own power supply and are connected to the conductors, in that modifying means are connected to the conductors in each of the stations provided for the transmission of data, which means modify exclusively pulses of the AC voltage having the second polarity in dependence on the data to be transmitted, and in that a detector for evaluating the amplitude of those pulses only which have the other polarity is connected to the conductors in each of the stations provided for the reception of data.

2. A system as claimed in claim 1, characterized in that the power source is designed for delivering the pulses of the AC voltage having the first polarity to the conductors at a lower ohmic value than the pulses having the other polarity.

3. A system as claimed in claim 2, characterized in that the power source is connected to the conductors via at least one resistor with a rectifier connected in parallel thereto.

4. A system as claimed in claim 1, characterized in that the power source comprises an AC voltage generator and a transformer having a primary winding and a secondary winding, which primary winding is coupled to the generator and which secondary winding is coupled to the conductors.

5. A system as claimed in claim 4, characterized in that a third conductor is provided which is coupled to the power source and to the stations.

6. A system as claimed in claim 5, characterized in that the secondary winding comprises a central connection which is coupled to the third conductor.

7. A system as claimed in claim 5, characterized in that two switches and a control unit are provided, preferably in the power source, which switches are arranged between the first and the third conductor and between the second and the third conductor, respectively, while the control unit closes the relevant switch in the case of an interruption in the first or the second conductor.

8. A system as claimed in claim 2, characterized in that one of the conductors is formed by a ground connection.

9. A system as claimed in claim 1, characterized in that a separation unit is included in at least one conductor, each separation unit subdividing the relevant conductor into a first and a second conductor portion and comprising a switch connected to the conductor portions and a monitoring unit which is connected to at least one conductor portion and is constructed for operating the switch when a voltage at at least one of the connected conductor portions rises to above a first triggering threshold or drops to below a second triggering threshold, and in that the switch is shunted by a current-limiting element.

10. A station for use in a system as claimed in claim 1 with connection terminals for at least two conductors for receiving power for operating circuits in the station and for receiving and/or transmitting data, wherein the following are coupled to the conductors:

voltage supply means for deriving from the conductors power exclusively from the pulses having the first polarity and for storing this power, modifying means for modifying exclusively pulses having the second polarity on the conductors in dependence on data to be transmitted, a detector for evaluating the amplitude of the second polarity only.

11. A station as claimed in claim 10, characterized in that the means comprise a rectifying arrangement and an energy storage device, which rectifying arrangement supplies electric power to the energy storage device exclusively during the pulses of the first polarity, and the energy storage device is coupled to voltage supply terminals of electronic circuits in the station.

12. A station as claimed in claim 10, characterized in that the voltage supply means comprise a series arrangement of a first rectifier, the energy storage device, and a second rectifier, which arrangement is connected between the first and the second conductor, and in that two connection terminals of the energy storage device are connected to a third conductor, which is coupled to the power source and to the stations via further rectifiers.

13. A station as claimed in claim 10, characterized in that the modifying means comprise a series arrangement of a first rectifier, a switchable impedance, and a second rectifier, and in that the junction points between the impedance and the first and the second rectifier are each connected to a third conductor, which is coupled to the power source and to the stations via respective further rectifiers.

14. A separation unit for a system as claimed in claim 9, characterized in that the switch controlled by the monitoring unit connects the conductor subdivided by this switch when the voltage exceeds the first triggering threshold and interrupts this conductor when the voltage drops to below the second triggering threshold.

15. A separation unit as claimed in claim 14, characterized in that the monitoring unit is connected to both conductor portions.

16. A separation unit as claimed in claim 14, characterized in that the switch is constructed for the conduction of a current in both directions.

17. A separation unit as claimed in claim 14, characterized in that the switch comprises a first and a second field effect transistor of the same conductivity type which are connected in series between the two conductor portions and whose gates are interconnected and are coupled to the monitoring unit.

18. A separation unit as claimed in claim 17, characterized in that the gates of the first and the second field effect transistor are connected to the junction point of the first and the second field effect transistor via a capacitor and a discharging element connected in parallel thereto and are connected to a third field effect transistor via a diode.

19. A separation unit as claimed in claim 18, characterized in that the capacitor in the switch stores the charge necessary for closing the first and the second field effect transistor in the half wave of the AC voltage which is opposed to the triggering threshold.

20. A separation unit as claimed in claim 17, characterized in that the monitoring unit comprises a third field effect transistor for each connected conductor portion, which transistor is connected between the non-subdivided conductor and the gates of the first and the second field effect transistor, and whose gate is coupled to the connected conductor portion, such that a connection of the monitoring unit to both conductor portions leads to a series connection of the associated third field effect transistors.

21. A separation unit as claimed in any one of the claims 19 and 20, characterized in that the conductivity type of the first and the second field effect transistor is opposed to the conductivity type of the third field effect transistors, while the conductivity type of the field effect transistors determines in which half wave of the AC voltage the triggering threshold for the monitoring unit lies.

22. A separation unit as claimed in claim 19, characterized in that the monitoring unit is provided with additional circuit portions which render the third field effect transistor non-conducting in the case of an overload in the half wave not monitored by means of the triggering thresholds.

23. A separation unit as claimed in claim 14, characterized in that the triggering threshold of the monitoring unit has a hysteresis, while the triggering threshold is high in the case of closed switches and the triggering threshold is low in the case of opened switches.

24. A separation unit as claimed in claim 14, characterized in that the current-limiting element comprises test resistors which can be switched over between a high-ohmic state and a low-ohmic state.

25. A separation unit as claimed in claim 24, characterized in that the high-ohmic test resistor is activated when the switch in a conductor is open, and the test resistor has a lower ohmic value owing to shunting of partial resistors when the switch is closed.

* * * * *